March 31, 1964  B. LONG  3,127,261

PROCESS FOR MAKING SHEET GLASS

Filed March 3, 1960  2 Sheets-Sheet 1

Bernard Long
INVENTOR.

BY

AGENT

March 31, 1964  B. LONG  3,127,261
PROCESS FOR MAKING SHEET GLASS
Filed March 3, 1960  2 Sheets-Sheet 2

Bernard Long
INVENTOR.

BY
AGENT.

United States Patent Office 3,127,261
Patented Mar. 31, 1964

3,127,261
PROCESS FOR MAKING SHEET GLASS
Bernard Long, Paris, France, assignor to G.B.D. societe anonyme Holding, a corporation of Luxembourg
Filed Mar. 3, 1960, Ser. No. 12,635
Claims priority, application France Mar. 23, 1959
2 Claims. (Cl. 65—83)

My present invention relates to the manufacture of flat glass by the continuous drawing of a solidifying sheet from a molten vitreous mass.

In my co-pending application Ser. No. 793,442, filed February 16, 1959, of which the present application is a continuation-in-part and which is now U.S. Patent No. 3,000,142, issued September 19, 1961, I have disclosed an improved process of this type by which the drawing of the sheet is substantially accelerated in comparison with conventional methods. According to that process, the flow of molten glass from the refining chamber of a tank furnace to a drawing chamber is so controlled as to suppress the formation of a return flow and to promote the development of a relatively viscous layer or "skin" along the bottom of the supply channel leading from the furnace to the draw pot, a similar skin being concurrently formed at the top surface of the flow whereby, as the sheet is drawn, a hotter glass mass of greater fluidity is entrained between the two skins which eventually constitute opposite faces of the sheet. In order to accomplish this result, again as taught in my aforementioned prior application, I cool the underside of the channel at such rate that substantially the same temperature gradient exists along both the upper and the lower reaches of the glass flow, this gradient preferably representing a drop of at least 100° C. per meter in the direction of the flow. The supply channel must be of considerable length, e.g. of two to three meters or approximately seven to ten feet, in order to provide a desired differential of 200 to 300° C. between furnace and drawing chamber with a temperature gradient of slightly more than 100° C. per meter. The lateral walls of the channel should be thermally insulated to minimize the loss of heat from the sides of the glass flow.

A principal object of my present invention is to provide an improvement of the process described, as well as means for carrying out the improved process, whereby the rate at which the glass is drawn may be still further accelerated.

Another object of this invention is to provide a process and means for improving the quality of a sheet continuously drawn from a molten glass mass in the manner set forth above.

Since the setting of the glass mass to form the more viscous layers is not instantaneous, these layers retain a certain plasticity over a substantial portion of their length so that the drawing force exerted upon them is only partially effective. This is especially true with reference to the lower skin which encounters the frictional resistance to the refractory material forming the bottom of the supply channel, this resistance becoming in fact more marked as the viscosity of the layer is increased. The rate at which the channel bottom may be cooled must, therefore, be limited to reduce such friction to a tolerable magnitude.

It is, accordingly, a more specific object of my present invention to provide means for reducing the friction between the channel bottom and the glass flow whereby the rate of cooling may be intensified, with consequent acceleration of the drawing speed and entrainment of a larger mass of fluid glass between the two skins.

I have found, in accordance with the present improvement, that the foregoing objects may be realized by covering the channel bottom with an anti-friction agent in the form of a highly mobile material which is solid at normal temperatures but fluid at the temperature of the molten glass, i.e. whose melting point is below substantially 1000° C., and which should be denser than the glass mass, immiscible there with and chemically inert with respect thereto. This material may be metallic, preferably containing tin alone or in substantial proportions as in, for example, lead-tin or copper-tin alloys (bronze).

Whereas a metallic anti-friction agent is a good thermal conductor, thus promoting the cooling of the lower layer of the glass flow, it has the added advantage of absorbing relatively little radiant heat (as compared with the refractory materials conventionally used) so that the central portion of the flow, designed to form the core of the sheet, is cooled only to a minor extent by radiation so as to retain its high fluidity. This is especially true in the case of tin which, at the operating temperatures involved, is in a state of near-oxidation in which its surface is glossy and reflects the thermal radiation coming from the interior of the glass flow. The lower zone of the flow may thus be cooled energetically across the metallic layer without materially affecting the overall mobility of the melt.

Moreover, the elevated thermal conductivity of the metallic anti-friction layer tends to equalize temperature differences normally occurring along the lower surface of the flow, these differences often leading to the formation of undesirable ripples in the rear face of the finished sheet (i.e. its remote side as seen from the tank furnace) constituted by the glass mass from the lower zones of the flow. Thus, the present invention greatly improves the quality of the finished product.

Since the rate of cooling of the flow in a system operating in accordance with the present improvement may be greatly increased, the desired temperature gradient may also be obtained with relatively short supply channels; in such case it will be possible to limit the anti-friction layer to the bottom of the draw pot itself.

The invention will be described in greater detail with reference to the accompanying drawing in which.

Figure 1:
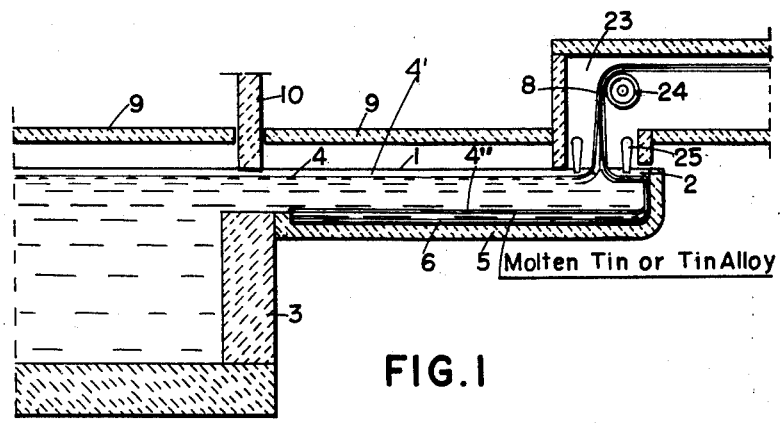
FIG. 1 illustrates somewhat diagrammatically, in longitudinal section, the supply channel and adjacent parts of a glass-drawing apparatus embodying the invention.

In FIG. 1 there is shown a glass-drawing apparatus comprising a tank furnace 3, a draw pot 2 and a supply channel 1 extending from the furnace to the draw pot; the latter forms the bottom of a drawing chamber 23 within which a sheet of glass 8 is drawn, by means not further illustrated, over the bending roll 24 from a molten mass 4 flowing unidirectionally in the sense indicated by the arrow. The roof structure 9 of the apparatus is provided with a baffle 10 which may be lowered to cut the flow of glass from the furnace to the draw pot. Conventional water coolers 25 within drawing chamber 23 assist in the solidification of the vitreous mass into the sheet 8 at the point where it is drawn from the pot 2.

The top layer of the glass flow 4 may be cooled simply by surface radiation, or by artificial means similar to the coolers 25, to produce an upper skin 4' which constitutes the proximal face to the sheet 8. The distal face of that sheet is formed by a lower skin 4" developing along the bottom of channel 1 as the glass flow loses heat through the channel bottom on its way to the draw pot 2. To promote this loss of heat and to minimize the friction encountered by the lower skin 4", I provide between the glass flow 4 and the common bottom 5 of channel 1 and draw pot 2 a relatively thin layer 6 of a highly mobile lubricant. This anti-friction layer 6, preferably consisting of molten tin or tin alloy, extends over substantially the entire length and width of the refractory bottom 5 and may have a depth of a few centimeters, compared with a depth of about 10 to 30 centimeters for the overlying glass mass as noted in my above-identified earlier application. The flow of this mass is controlled by the rate at which the skins 4′ and 4″ can be drawn off within chamber 23, this rate in turn being preferably as rapid as the lower skin 4″ is able to slide on the metallic layer 6. The relatively low coefficient of friction between this layer and the glass melt thus enables a considerable step-up of the production rate of sheets of given thickness, compared with earlier processes.

Figure 2:
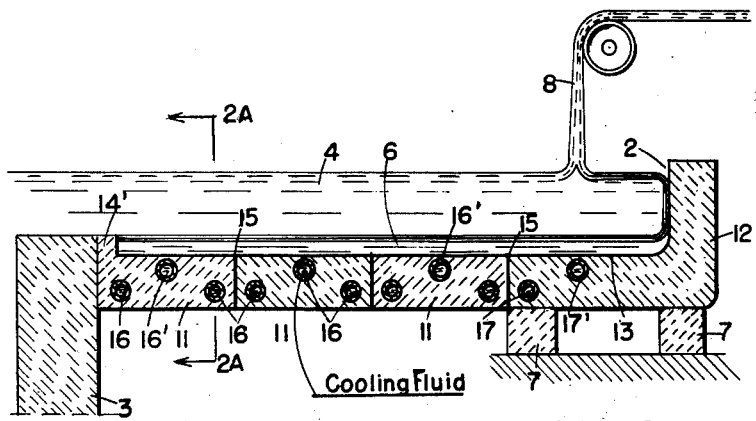
FIG. 2 is a similar sectional view of a modified apparatus according to the invention.
Figure 2A:
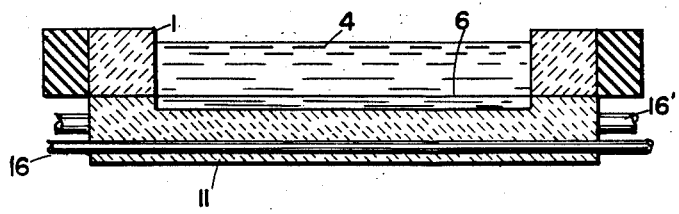
FIG. 2A is a cross-sectional view taken on the line 2A—2A of FIG. 2.

It will be apparent that forced cooling may be resorted to for the purpose of intensifying and/or more accurately controlling the removal of heat from the bottom zone of the glass flow. This has been illustrated in FIGS. 2 and 2A where some of the structural elements of FIG. 1 have been omitted for the sake of simplification. Here the trough-shaped refractory member 5 of FIG. 1 has been replaced by a plurality of blocks 11 of increased thickness, together constituting the bottom of the supply channel, and a terminal block 12 which rests on stools 7 and constitutes the draw pot 2. The block 11 and the draw pot 12 may consist of a refractory material of good heat conductivity, e.g. fused corundum. Each of the blocks 11 is shown provided with two smaller and one larger cooling tube 16, 16′, the larger tube 16′ extending near the upper surface of the channel bottom while the smaller tubes 16 are located farther down and close to the junctions 15 of these blocks with neighboring elements; the latter tubes thus help solidify any molten material that might penetrate alongside these blocks, thereby insuring a tight joint. The draw pot 12 is similarly provided with a main cooling tube 17′, positioned near its surface 13 which carries the metallic layer 6, and with an auxiliary cooling tube 17 adjacent its junction 15 with the nearest channel-forming block 11.

Each of the blocks 11 and draw pot 12 are provided with a pair of lateral ledges 14 (FIG. 2A) which are aligned with the side walls of the supply channel 1 and of the draw pot 12 and which prevent the outflow of the molten layer 6 at these side walls. A similar ledge 14′ (FIG. 2) is formed along the edge of the first block 11, i.e. the one closest to the furnace 3, to prevent the entrance of the metal from layer 6 into the tank.

Figure 3:
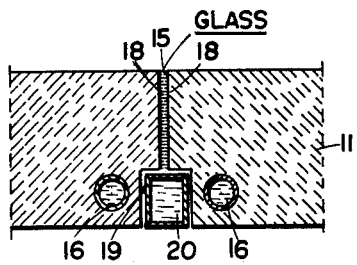
FIGS. 3 and 3A are sectional detail views illustrating other modifications.

FIG. 3 illustrates a more elaborate arrangement for insuring fluid-tightness at the junction 15 between a pair of blocks 11 or between one such block and the draw pot 12. It includes, in addition to the cooling tubes 16, a further duct 20 traversed by coolant and accommodated in a recess 19 formed at the underside of these blocks in alignment with their junction 15. A slight gap between the adjoining faces 18 of the blocks is filled with a mass of glass hardened in situ after having been introduced into the gap in its molten state, preferably prior to the charging of the furnace 3. This is done before the metallic layer 6, not shown in FIG. 3, is placed over the blocks 11 and 12.

Figure 3A:
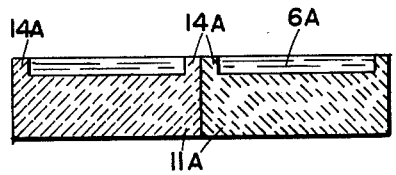

In FIG. 3A I show a modified form of blocks 11a formed along their adjoining sides with ledges 14a to prevent the entrance of metal into the inter-block joints. The metal in this case forms a plurality of disconnected layers 6a which are level with the ledges 14a and act in the same manner as the layer 6 previously described, the slight increase in friction due to the provision of the ledges 14a being insignificant. It will be apparent that a similar ledge may be provided at the forward edge of the draw pot 12, i.e. along its junction with the last channel-forming block 11a; this has been illustrated in FIG. 4.

Figure 4:
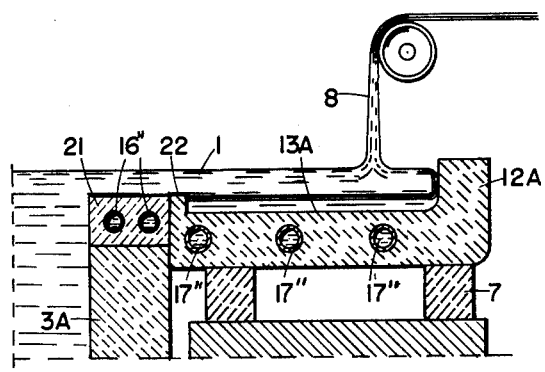
FIG. 4 is a sectional view, similar to FIGS. 1 and 2, of a further apparatus according to the invention in which the draw pot is connected directly to the tank furnace without the intermediary of an elongated supply channel.

The apparatus of FIG. 4 represents a system wherein the draw pot 12a immediately adjoins the tank furnace 3a, the intervening blocks 11 or 11a having been omitted. At the exit of furnace 3a there is provided a narrow block 21 accommodating two tubes 16″ which cool the short stretch of flow from the tank to the draw pot. The layer 6 is here confined to the area above the bottom 13a of draw pot 12a and transmits the cooling effect of three tubes 17″ to the overlying melt, this layer being held in place by the marginal ledges of the draw pot of which one has been shown at 22.

In a typical embodiment conforming to the foregoing disclosure, which has been successfully tested in practice, the length of the supply channel 1 was 190 cm., the depth of the layer 6 (which consisted of molten tin) was 3.5 cm. and the height of the overlying melt was 18.5 cm. The amount of heat removed at the bottom of the supply channel was 250 kilogram-calories per square meter; the resulting temperature gradient along the channel was 160° C. per meter. With this apparatus it was possible to draw a sheet of 3.5 mm. thickness at a rate of approximately 156 meters per hour, such rate representing an increase of 30% in comparison with prior processes where the maximum drawing speed was 120 meters per hour.

My invention is, of course, not limited to the specific structural and procedural details described and illustrated but may be realized in various modifications intended to be embraced within its spirit and scope, except as further limited by the appended claims.

I claim:
1. A process for making flat glass, comprising the steps of refining glass in a tank furnace, producing a substantially horizontal flow of molten glass from said tank furnace to a draw pot over a highly heat-conductive layer which is fluid at the temperature of said molten glass and consisting of an antifriction agent denser than the glass, immiscible therewith and chemically inert with respect thereto, cooling the top surface of said flow sufficiently to cause the formation of a more viscous vitreous first skin therealong, cooling the underside of said layer at a similar rate sufficient to cause the formation of a vitreous second skin of similar viscosity along the lower surface of said flow, continuously drawing said skins along with a more fluid intervening portion of said flow from said draw pot, and solidifying the drawn glass mass into a sheet, said rate of cooling being upwards of substantially 150° C. per meter.

2. A process according to claim 1 wherein said skins are drawn at a minimum speed of substantially 150 meters per hour.

References Cited in the file of this patent
UNITED STATES PATENTS

| | | |
|---|---|---|
| 1,489,875 | Whittemore | Apr. 8, 1924 |
| 1,564,240 | Hitchcock | Dec. 8, 1925 |
| 1,695,528 | Brownlee | Dec. 18, 1928 |
| 1,805,218 | Mambourg | May 12, 1931 |
| 3,000,142 | Long | Sept. 19, 1961 |